United States Patent [19]

Lewis

[11] Patent Number: 5,010,148

[45] Date of Patent: Apr. 23, 1991

[54] FLAME RETARDANT AROMATIC POLYCARBONATE COMPOSITIONS

[75] Inventor: Larry N. Lewis, Scotia, N.Y.

[73] Assignee: General Electric Company, Schenectady, N.Y.

[21] Appl. No.: 399,095

[22] Filed: Aug. 28, 1989

[51] Int. Cl.$^5$ .................................... C08F 283/02
[52] U.S. Cl. .................................. 525/464; 524/537
[58] Field of Search ............................... 525/464

[56] References Cited

U.S. PATENT DOCUMENTS

| | | | |
|---|---|---|---|
| 3,742,083 | 6/1973 | Bialous | 525/464 |
| 3,933,730 | 1/1976 | Hoogeboom | 260/37 |
| 3,971,756 | 7/1976 | Bialous et al. | 260/45.7 |
| 4,110,299 | 8/1978 | Mark | 260/45.8 |
| 4,916,194 | 4/1990 | Policastro et al. | 525/464 |
| 4,954,549 | 9/1990 | Lewis et al. | 524/264 |

*Primary Examiner*—Melvyn I. Marquis
*Attorney, Agent, or Firm*—William A. Teoli; James C. Davis, Jr.; William H. Pittman

[57] ABSTRACT

Flame retardant compression moldable aromatic thermoplastic polycarbonate compositions are provided capable of satisfying the UL-94 V-O requirements and substantially lowering the heat and smoke emitted during burning. The aromatic thermoplastic polycarbonates utilize an aromatic polycarbonate resin in combination with an effective amount of a silicate resin having condensed triorganosiloxy units such as trimethylsiloxy units and diorganosiloxy units such as methylvinylsiloxy units.

4 Claims, No Drawings

FLAME RETARDANT AROMATIC POLYCARBONATE COMPOSITIONS

REFERENCE TO COPENDING APPLICATIONS

Reference is made to copending applications of Lewis et al. Ser. No. 399,094, filed Aug. 28, 1989, now U.S. Pat. No. 4,954,549, for Flame Retardant Aromatic Polycarbonate Compositions, and Davis et al, Ser. No. 07/899,096, for Flame Retardant Aromatic Polycarbonate Copolymer Compositions, filed concurrently herewith and incorporated herein by reference, and copending application of Policastro et al, Ser. No. 07/319,026, filed Mar. 6, 1989 for Flame Retardant Aromatic Polycarbonate Blends, now U.S. Pat. No. 4,916,194 which also is incorporated herein by reference.

BACKGROUND OF THE INVENTION

The present invention relates to flame retardant halogen-free aromatic polycarbonates compositions utilizing an effective amount of a silicate resin as a flame retardant for a polycarbonate resin, where the silicate resin has condensed triorganosiloxy units, such as trimethylsiloxy units, and condensed diorganosiloxy units, such as methylvinylsiloxy units.

Prior to the present invention as shown, for example, by Bialous, et al, U.S. Pat. No. 3,971,756, or Mark et al, U.S. Pat. No. 4,110,299, various organic metal salts, or inorganic halides were utilized in combination with organosiloxanes to improve the flame retardant properties of polycarbonates. Certain organosilicon materials, such as organosilanes also were employed as plasticizers with polycarbonates as shown by Mark et al, U.S. Pat. No. 4,230,611.

In copending application of Policastro et al, Ser. No. 07/319,026, now U.S. Pat. No. 4,916,194 several poly(arylene silicon materials, such as aromatic polyestersiloxanes, or aromatic polyimidesiloxanes were found to be useful flame retardants for aromatic polycarbonates when used in effective amounts. However, the intermediates used in making such poly(arylsilicon) materials are not commercially available.

As used hereinafter, the term "flame retardance" or "nonflammable" or "flame resistance" with respect to the flame retardant polycarbonate compositions of the present invention means that the flame retardant polycarbonates can satisfy the UL94 V-0 requirements for flammability, as shown by the "Flammability of Plastic Materials Bulletin" of Jan. 24, 1980. More particularly, a 5"×½"×1/16" polycarbonate test bar containing an effective amount of the flame retardant is suspended vertically over a ¾" Bunsen Burner flame as provided in the aforementioned UL94 test. The test sample preferably exhibits a UL94 V-0 rating which includes the following criteria:

A. Not have any specimen which burns with flaming combustion for more than 10 seconds after application of the test flame.

B. Not have a total flaming combustion time exceeding 50 seconds for 10 flame applications for each set of five specimens.

C. Not have any specimens which burn with flaming or glowing combustion up to the holding clamp.

D. Not have any specimens which drip flaming particles that ignite dry absorbent surgical cotton located 12 inches (305 mm) below the test specimen.

E. Not have any specimens with glowing combustion which persists for more than 30 seconds after the second removal of the test flame.

Although flame retardant aromatic polycarbonate compositions have been made using various materials, such as organic alkaline metal salts, siloxanes, inorganic halides, or certain polyarylene silicon materials, it would be desirable to employ halogen-free material as flame retardants which can be made from readily available materials and which provide a V-0 UL-94 rating when blended with polycarbonates. In addition, it is often difficult to make flame retardant polycarbonate capable of satisfying the UL-94 V-0 test requirements at 1/16" which can be of potential importance in certain applications, such as business machine housings.

In addition to the UL94 test as shown above, fabricators of materials used in aircraft and sky-scrapers, often require that the materials emit low smoke and heat when burning. E.E. Smith, Fire Technology 8 (1972) 237 describes the Ohio State University Test (OSU) which identifies some of the low smoke standards used by industry.

SUMMARY OF THE INVENTION

The present invention is based on the discovery that certain silicate resins, as defined hereinafter, having condensed triorganosiloxy units, such as trimethylsiloxy units and condensed diorganosiloxy units, such as methylvinylsiloxy units, which can be made from readily available commercial materials has been found to be effective as a flame retardant for polycarbonate resins. When these halogen-free silicate resins are used in an effective amount, the resulting polycarbonate blends have been found to satisfy the UL-94 V-O requirements, even when compression molded at a 1/16" thickness.

STATEMENT OF THE INVENTION

There is provided by the present invention, a flame retardant halogen-free aromatic polycarbonate composition comprising:

(A) an aromatic polycarbonate resin, and (B) an effective amount of a silicate resin having from 1 to 2 moles of condensed triorganosiloxy units selected from trimethylsiloxy and dimethylphenylsiloxy units, and from 0.15 mole to 1 mole of condensed diorganosiloxy units selected from the class consisting of methylvinylsiloxy units, divinylsiloxy units and dimethylsiloxy units, per mole of $SiO_2$ units The silicate resin used in the practice of the present invention as a flame retardant can be made by initially hydrolyzing an alkali metal silicate, such as a sodium silicate in an aqueous acid media, for example an aqueous solution of concentrated hydrochloric acid in the presence of ice. After the mixture is thoroughly stirred, an alcohol can be added, such as isopropyl alcohol. Organohalosilane can be added to the mixture, such as triorganohalosilane, for example trimethylchlorosilane or dimethylphenylchlorosilane, and a diorganosilane, such as methylvinyldichlorosilane along with an organic solvent such as toluene. The resulting mixture can then be refluxed for several hours with rapid stirring followed by the addition of more toluene. The organic resin can be heated to effect the removal of volatile components having a boiling point less than about 125° C. Additional organic solvent can be added along with an aqueous solution of an alkali metal hydroxide, such as potassium hydroxide, followed by refluxing the mixture. Water of condensation can be removed by standard means. After the mixture has been heated for several hours or until no more water is formed, concentrated hydrochloric acid can be added until the mixture is slightly acidic, that is about 4 ppm of HCl as determined by titration with KOH. The mixture then can be filtered through Celite to provide a clear liquid.

Following the above procedure, additional silicate resins can be made utilizing triorganohalosilanes, such as dimethylphenylchlorosilane, and diorganodihalosilane such as dimethyldichlorosilane, and divinyldichlorosilane.

Among the aromatic polycarbonates which can be rendered flame retardant in the practice of the invention, there are included aromatic polycarbonates formed by phosgenating the following bisphenols: p,p'bisphenol A, m,pbisphenol A, o,p-bisphenol A, spirobiindane bisphenol and tetramethylbisphenol A and tetramethylbiphenol. Copolycarbonates containing the aforementioned bisphenols as a major bisphenol constituent are also included. Preferably, the polycarbonate is a bisphenol A (BPA) polycarbonate having an intrinsic viscosity (IV) of from 0.35 to 1.8 dl/g in chloroform at 25° C.

Additional polycarbonates and methods for making which are incorporated herein by reference, can be found in U.S. Pat. No. Schnell, et al., U.S. Pat. No. 3,028,365; Idel, et al., U.S. Pat. No. 4,185,009; Evans, et al., U.S. Pat. No. 4,605,731; Evans, et al., U.S. Pat. No. 4,701,519; and Brunelle, et al., U.S. Pat. No. 4,727,134. In addition Kirk-Othmer, 3rd Edition, Vol. 18, pages 479-494, shows additional procedures.

In the practice of the present invention, a preferred procedure for incorporating the silicate resin into the polycarbonate is by combining the silicate, which can be a clear mixture in xylene at from 20 to 80% solids with the polycarbonate resin in finely divided form, and optionally with a sufficient amount of an inert organic solvent, such as a branched alkanol, for example, isobutanol to facilitate the incorporation of the silicate into the polycarbonate. The resulting mixture can then be allowed to dry for several hours under ambient conditions and then placed in a vacuum oven at 90° to 130° C. for several hours. The resulting blend can then be compression molded at 180° to 220° C. under a pressure of from 3000 psi to 7000 psi for 2 to 5 minutes. can then be compression molded at 180° to 220° C. under a pressure of from 3000 psi to 7000 psi for 2 to 5 minutes.

An effective amount of silicate resin is 3 to 10% by weight and preferably 5 to 6% by weight based on the weight of aromatic polycarbonate composition.

The flame retardant polycarbonate compositions of the present invention also can be reinforced with inert fillers such as silica filler, carbon fibers or glass fibers. The proportion of filler which can be utilized can vary from 1 to 100 parts of filler, per 100 parts of the resulting aromatic polycarbonate composition by weight.

In order that those skilled in the art will be better able to practice the present invention, the following example is given by way of illustration and not by way of limitation. All parts are by weight.

EXAMPLE

There was added 168 grams of a 40% aqueous solution of sodium silicate, $Na_2O[SiO_2]_{3.22}[H_2O]_7$ providing 67.2 grams of solids and 0.176 mole of sodium oxide, and 0.567 mole of $SiO_2$ along with 255.2 grams of water to a mixture of 84.7 grams of concentrated hydrochloric acid and 105.3 grams of water over a period of about 3 minutes. The resulting mixture was stirred and there was added 200.8 grams of isopropanol. There was then added to the resulting mixture, while it was stirred, 104 grams (0.806 mole) of dimethylphenyl chlorosilane, 19.4 grams (0.138 mole) of methylvinyl dichlorosilane and 26.8 grams of toluene. The mixture was then heated to reflux for 2 hours with rapid stirring. After 2 hours, an additional 50 grams of toluene was added. The organic layer of the resulting mixture was then heated and all volatile components having a boiling point of less than 125° C. were removed. There was obtained 130 grams of a clear liquid. An additional 50 grams of toluene was added followed by the addition of 0.27 gram of a 30% potassium hydroxide solution. The mixture was refluxed for 3 hours and water of condensation was removed with a Dean stark trap. There was then added 4 microliters of concentrated hydrochloric acid resulting in a mixture having 4 ppm. of HCl as determined by titration with potassium hydroxide. The mixture was then filtered through Celite to provide a clear liquid having about 38% solids. Based on this method of preparation, the resulting silicate had 1.4 moles of dimethylphenylsiloxy units and 0.25 mole of methylvinylsiloxy units, per $SiO_2$ unit.

Following the above procedure, several additional silicate resins were prepared. UL-94 test specimens were then prepared from the silicate resins by combining 3 grams of silicate solids in the form of a resin solution with 30 grams of Lexan 140 polycarbonate resin in finely divided form and 30 grams of isobutyl alcohol. The resulting mixture was allowed to rest for 17 hours under ambient conditions and then placed in a vacuum oven at 100° C., 30 torr for 17 hours. Sheets of 1/16" thickness were prepared by compression molding at 200° C. and 5000 psi for 3 minutes. The 1/16" sheets were then cut into ½" wide bars for the UL-94 test. The following results were obtained where M is trimethylsiloxy, $M^{ph}$ is dimethyl phenylsiloxy, D is dimethylsiloxy, $D^{Vi}$ is methylvinylsiloxy, Q is tetrasiloxy or $SiO_2$, and FOT is flame out time.

| Silicate (Wt. %) | Silicate (Mols*) | UL 94 Data | | |
|---|---|---|---|---|
| | | FOT (1st) | FOT (2nd) | Rating |
| 6 | M 1.4 D 0.5 Q | 2.2 | 4.2 | V–0 |
| 6 | M 1.4 $D^{vi}$ 0.5 Q | 2.8 | 4.9 | V–0 |
| 6 | M 1.4 D 0.75 Q | 1.6 | 4.1 | V–0 |
| 8 | " | 3.8 | 6.3 | V–1 |
| 6 | M 1.4 $D^{vi}$ 0.25 Q | 2.5 | 4.7 | V–0 |
| 6 | $M^{ph}$ 1.4 $D^{vi}$ 0.25 Q | 1.6 | 6.6 | V–0 |

*mole ratio of units

The above results show that the silicate resins used in the practice of the present invention can provide flame retardant polycarbonates exhibiting UL-94 V-O ratings at 1/16" thickness. However, when the wt. % of the resin exceeds 6, flame retardance is reduced.

The following is smoke and heat release rate values of the flame retardant compositions of the present invention compared to Lexan resin free of flame retardant with 1/16" test slabs in accordance with the Ohio State University Test (OSU).

|  | OSU Data | | | |
| --- | --- | --- | --- | --- |
|  | Heat (KW/m$^2$) | | Smoke (−Min−m$^2$) | |
| Silicate (Wt. %) | 2 Min. | Peak | 2 Min. | Peak |
| — | 240 | 244 | 629 | 756 |
| M 1.4 D$^{vi}$ 0.25 Q (6) | 151 | 156 | 269 | 281 |
| M 1.4 D 0.75 Q (6) | 129 | 137 | 198 | 243 |

It was further found that the smoke and heat release rate values of 1/16″ test slabs of the present invention and compositions using halogenated salts and organic metal salts of the prior art in accordance with OSU test standards were substantially equivalent.

Although the above example is directed to only a few of the very many variables which can be employed in the practice of the present invention, it should be understood that the present invention is directed to the use of a much broader variety of silicate resins and polycarbonates as set forth in the description preceding this example.

What is claimed is:

1. Flame retardant halogen-free aromatic polycarbonate composition comprising:

(A) an aromatic polycarbonate resin, and (B) an amount of a silicate resin which is effective for imparting flame retardance to the halogen-free aromatic polycarbonate composition, where the silicate resin has from 1 to 2 moles of condensed triorganosiloxy units selected from the class consisting of trimethylsiloxy and dimethylphenylsiloxy units, and from 0.15 mole to 1 mole of condensed diorganosiloxy units selected from the class consisting of methylvinylsiloxy units divinylsiloxy units and dimethylsiloxy units, per mole of SiO$_2$ units.

2. An aromatic polycarbonate composition in accordance with claim 1, where the aromatic polycarbonate is a bisphenol A polycarbonate.

3. An aromatic polycarbonate composition in accordance with claim 1, wherein the silicate resin, the triorganosiloxy units are trimethylsiloxy units and the diorganosiloxy units are, methylvinylsiloxy units.

4. An aromatic polycarbonate in accordance with claim 1, wherein the silicate resin, the triorganosiloxy units are trimethylsiloxy units, and the diorganosiloxy units are dimethylsiloxy units.

* * * * *